Oct. 17, 1950  H. R. HARDING  2,525,796
TWO-WAY WASHER
Filed Feb. 4, 1949

Inventor
HIRAM R. HARDING.
By Howard J. Whelan.
Attorney

Patented Oct. 17, 1950

2,525,796

UNITED STATES PATENT OFFICE 2,525,796

TWO-WAY WASHER

Hiram R. Harding, Baltimore, Md., assignor of fifty per cent to Harry E. Karr, Baltimore, Md., and twenty-five per cent to Logan C. Harding, Hopewell, Va.

Application February 4, 1949, Serial No. 74,558

3 Claims. (Cl. 251—27)

This invention relates to washers employed with conventional spigots and globe valves used for the control of fluids flowing through piping connected thereto.

It is of the same type as is outlined by the same applicant in the application filed on or about December 17, 1948, and having Serial Number 65,771 for Double Acting Washers.

It has among its objects to provide a new and improved washer for spigots, globe valves and the like that will avoid one or more of the disadvantages and limitations of the prior art.

Another object is to provide a new and improved washer for globe valves and the like that will provide a water-tight closure at the seat of the valve and have an exceptional wearing capacity and adjustability in this use.

A further object of the invention is to provide a new and improved washer for a globe valve and the like, that may be made from relatively thin material and formed into a contour enabling it to provide plural contacting surfaces for closing the orifices in the valve that can resiliently wedge themselves into place as the valve is tightened into a shut position, but quickly unloosening when opened.

Another object of the invention is to provide a washer for spigots and the like which on contacting the valve seat will travel downward and be forced outwardly to seal the valve seat and throat to seal the valve passage against leakage.

A further object is to provide a washer which can be applied to a conventional spigot and be self centering and rock on the spindle and its holding screw as it is forced downwardly and outwardly to seal the spigot.

Other objects will become apparent as the invention is described in more detail.

The conventional washer in a spigot or globe valve consists of a flat nonrotatable disc that engages flat against the valve seat as the stem is screwed downwardly therein, and closes off the passages in the valve. If there is any unevenness in the washer or on the face of the seat, the valve begins to leak. The washer is usually made of fibre, leather or other semi-soft material that has a limited amount of resiliency. This allows it to adjust itself to the surface and limit the leakage if screwed down more tightly. This additional pressure increases the wear on the washer and cuts it up so that it becomes irreparably damaged in a short time causing the valve to leak. The valve then has to have its washer replaced. In this invention, a washer unit is constructed to provide for plural seating on the valve seat in series. Thus if one seating becomes leaky, the valve will be kept sealed by another seating and its usage still kept effective. Since the washer is preferably made of a material that has flexible characteristics, it adjusts itself by bending and expanding so as to continue its tightness and it does not depend on the compression of the material itself to do it. Thus the rotation of the spindle does not rotate the washer unit on the seat of the valve and permits a resilient contact thereon that flexes the washer as it presses downwardly and outwardly to double seal the passage and prevent excessive wear, whereas the conventional washer is not bent but impressed severely and grooved deeply by the seat. It is torn thereby as it is rotated, and frictionally rubbed over it under the excessive pressure. Any surface unevenness in the seat enables the valve to leak. In this invention, the washer rotates and having several closure surfaces that wedge aaginst the surfaces of the seat and valve throat and affords much more resistance to leakage than other conventional washers can afford.

For a better understanding of the invention, its principles and the objects thereof, reference is made to the appended drawings, wherein several forms of the invention are disclosed, by way of examples. The drawings illustrate the manner in which the device may be used and indicate its preferred structure, while the scope of the invention is brought out in the claims.

In the drawings.

Similar reference numerals relate to the same parts in the various views.

Figure 2:
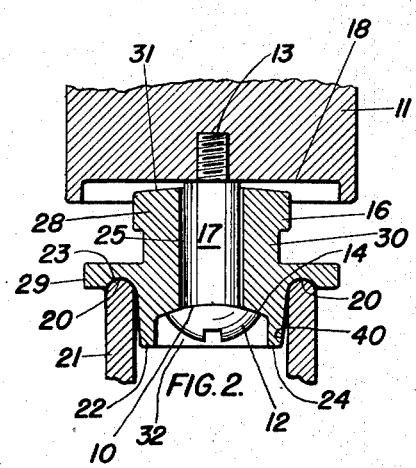
Figure 2 is a sectional elevation of the washer shown in Figure 1 mounted on the stem of a spigot or globe valve with parts broken away to indicate its relation to the valve seat and throat before the valve is closed.
Figure 3:
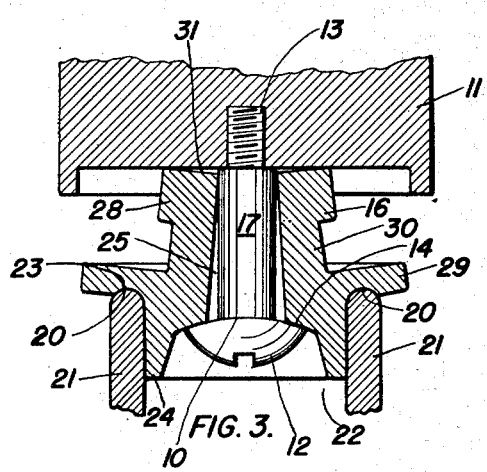
Figure 3 is a view similar to Figure 2, showing the washer in double closing contact with the valve seat.

In the structure shown in Figure 2, a stem 11 of a conventional spigot or globe valve is provided with a screw 12 for engagement in the screw portion 13 of the stem. The operation of the stem 11 up and down in the valve is brought about by its turning through the manipulation of the handle attached to its extending spindle. A washer 16 is attached by the screw 12 inserted in the bottom of the stem in a conventional manner. This screw has an arcuate under head 10 which contacts the concaved surface 14 of the washer 16 to allow it to tilt when the washer enters passage 22. The bottom of the stem 11 has a recessed flat face 18 that aligns with the recessed face of the seat 20 of the valve, that is underneath. The seat 20 has an annular ridge ring 21 about a central passage 22 through which the water flowing through the valve passes upwardly and outwardly. The washer 16 has its underface contoured to engage with and rest on the seat 20 of the ridge ring 21 as indicated in Figures 2 and 3 in the drawings. This is arranged for by having a circular saddle groove 23 bordered by the relatively long pending ring 24 bordering its central passage 25. The outer surface is tapered slightly at 40 to facilitate centering of the washer in the central passage 22. The central passage 25 enables the screw shank 17 to pass through the washer and be screwed into the stem 11, while its under head 10 presses on the concaved surface 14 in the countersunk recess 32 in the underside of the washer. The upper surface of the washer is preferably formed to provide a tapering walled cylindrical body 28 about the passage 25 with the seating portion 29 of the washer spaced an appreciable distance below it. A circular groove 30 is cut in the upper surface of the body 28. This groove 30 in conjunction with the underside saddle groove 23 aligned with it weaken the washer at this point sufficiently to provide flexibility at this section. This enables the pending ring 24 to bend downwardly and outwardly when supported and fulcrumed on the seat 20 of the ridge ring 21. Thus the pressure of the stem 11 when screwed down, is transferred to the seat surface 20 of the ring 21 by the saddle groove surface 23 and against the inner side wall of the passage 22 of the ring 24, thereby inducing double closure action at the seat and innerside wall of ring 21. The surface 31 at the upper end of the body 28 is slightly convexed to facilitate its movement during the fulcruming action.

Figure 1:
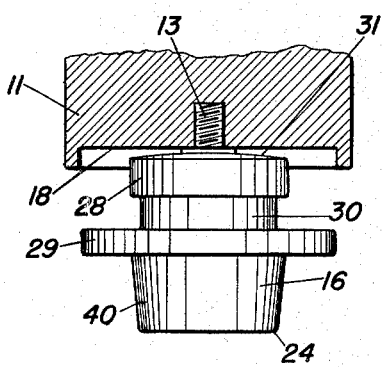
Figure 1 is a side elevation of a washer formed from strong flexible material, such as metal, embodying this invention; attached to a stem.
Figure 4:
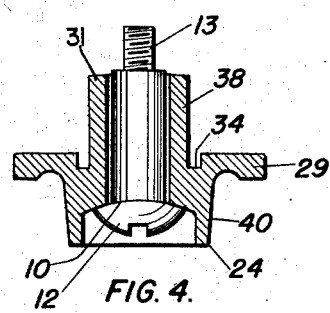
Figure 4 is a sectional view taken through a form of washer showing the holding screw.
Figure 5:
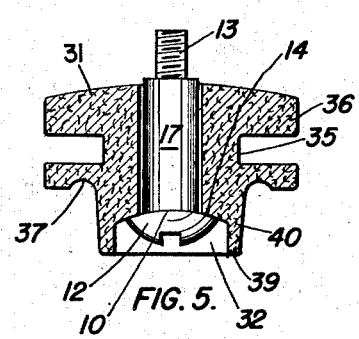
Figure 5 is a sectional view taken through a modified form of washer.

In Figure 3, the washer 16 is shown bearing tightly on the seat 20 and against the inner side wall of ring 21. In Figure 2, the washer 16 is shown closing the seat 20, but not binding on the walls of the passage 22. The countersunk recess 32 and the central pending ridge ring 24 have a relatively straight inside wall, while their outside wall 40 has an approximate taper of three degrees. In Figure 4 the same general construction is used except that the groove 34 is cut in a vertical plane instead of horizontally as shown in Figures 1, 2 and 3. In Figure 5, the washer uses a fiber material and depends on its inherent flexibility, and on the horizontal groove 35 in its upper body 36 as well as upon the saddle groove 37 having a central ridge ring 39 of limited size, provided with the countersunk recess 32.

The general action of the washer is similar in all forms but modified slightly to suit the variations induced by the varying thickness in each particular structure.

While but two general forms of the invention are shown in the drawings and described in the specifications, it is not desired to limit this application for patent to these particular forms as it is appreciated that other forms could be made that would use the same principles and come within the scope of the appended claims.

Having thus described the invention, what is claimed is:

1. A flexible washer adapted to cooperate with a valve stem and a cylindrical valve seat, said washer having a normally arcuate upper surface arched away from the bottom surface of the valve stem, a cylindrical extension depending from said upper surface, an outward flange midway of said extension resting on the valve seat when the valve stem is in closed position, the lower end of said cylindrical extension having its outer wall penetrating within the cylindrical valve seat and having a taper normally spacing its outer wall from the inner wall of the valve seat, and a bolt extending through an axial opening in said washer and having screw-threaded engagement with the valve stem, whereby, when said bolt is driven home, the upper arcuate surface of said washer arches towards the bottom surface of the valve stem and the outer wall of the lower end of the cylindrical extension contacts the inner wall of the cylindrical seat.

2. A flexible washer as set forth in claim 1, the upper end of the washer between its upper surface and the outer flange being provided with a weakened portion to enhance the flexibility of the washer.

3. A flexible washer as set forth in claim 1, the axial opening through said washer comprising a cylindrical chamber extending from the upper surface of said washer to a point below the outer flange, and a larger lower chamber to accommodate the head of said bolt, the meeting plane of said chambers providing an abutment for the said bolt head when the bolt is driven home in the valve stem.

HIRAM R. HARDING.

REFERENCES CITED

The following references are of record in the file of this patent:

UNITED STATES PATENTS

| Number | Name | Date |
|---|---|---|
| 855,350 | Singmaster | May 28, 1907 |
| 1,413,764 | Mueller | Apr. 25, 1922 |
| 1,686,849 | Frauenheim | Oct. 9, 1928 |
| 1,750,462 | Cornelius | Mar. 11, 1930 |

FOREIGN PATENTS

| Number | Country | Date |
|---|---|---|
| 399,510 | Great Britain | Oct. 6, 1933 |